US009286334B2

(12) United States Patent
Velasco

(10) Patent No.: US 9,286,334 B2
(45) Date of Patent: Mar. 15, 2016

(54) VERSIONING OF METADATA, INCLUDING PRESENTATION OF PROVENANCE AND LINEAGE FOR VERSIONED METADATA

(75) Inventor: Marc Velasco, Orange, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/183,840

(22) Filed: Jul. 15, 2011

(65) Prior Publication Data

US 2013/0018873 A1    Jan. 17, 2013

(51) Int. Cl.
*G06F 7/00* (2006.01)
*G06F 17/30* (2006.01)

(52) U.S. Cl.
CPC ................ *G06F 17/30309* (2013.01)

(58) Field of Classification Search
None
See application file for complete search history.

(56) References Cited

U.S. PATENT DOCUMENTS

| 5,806,078 | A | | 9/1998 | Hug et al. |
| 5,890,164 | A | | 3/1999 | Nielsen |
| 5,999,947 | A | * | 12/1999 | Zollinger et al. ............ 1/1 |
| 6,108,670 | A | | 8/2000 | Weida et al. |
| 6,681,369 | B2 | | 1/2004 | Meunier et al. |
| 7,051,009 | B2 | | 5/2006 | Suermondt et al. |
| 7,610,545 | B2 | | 10/2009 | Wagner et al. |
| 7,693,864 | B1 | | 4/2010 | Pasupathy et al. |
| 7,721,259 | B2 | | 5/2010 | Heinke et al. |
| 7,987,172 | B1 | | 7/2011 | Carver |
| 8,250,037 | B2 | | 8/2012 | Andersen et al. |
| 8,284,198 | B1 | | 10/2012 | Hackworth et al. |
| 8,538,989 | B1 | | 9/2013 | Datar |
| 8,555,157 | B1 | | 10/2013 | Fu |
| 9,015,118 | B2 | | 4/2015 | Velasco |
| 2002/0023097 | A1 | | 2/2002 | Ripley |
| 2002/0073138 | A1 | * | 6/2002 | Gilbert .................... G06F 17/30 709/201 |
| 2002/0123988 | A1 | * | 9/2002 | Dean ................ G06F 17/30864 1/1 |
| 2004/0019846 | A1 | * | 1/2004 | Castellani et al. ............ 715/500 |
| 2005/0060281 | A1 | * | 3/2005 | Bucher ............. G06F 17/30011 1/1 |
| 2005/0071741 | A1 | | 3/2005 | Acharya |
| 2005/0154761 | A1 | | 7/2005 | Lee et al. |
| 2005/0165865 | A1 | * | 7/2005 | Farmer ............. G06F 17/30592 1/1 |

(Continued)

FOREIGN PATENT DOCUMENTS

| CN | 1794207 A | 6/2006 |
| WO | 2006026636 A2 | 3/2006 |
| WO | 2011150027 | 1/2011 |

OTHER PUBLICATIONS

U.S. Appl. No. 13/555,559.

(Continued)

*Primary Examiner* — Debbie Le
*Assistant Examiner* — Hasanul Mobin
(74) *Attorney, Agent, or Firm* — Farrokh Pourmirzaie; Edell, Shapiro & Finnan, LLC

(57) ABSTRACT

Metadata associated with content is versioned by receiving updated values for the metadata and storing the updated values and also previous values for metadata separately from the content, comparing the updated values to the previous values of the metadata, and determining a modification indicator for the metadata based upon the comparison of the updated values to the previous values of the metadata, where the modification indicator provides an indication of extent of differences between the updated and previous values. The modification indicator for the metadata can further be displayed to provide version information for the metadata to a user.

15 Claims, 4 Drawing Sheets

(56) References Cited

U.S. PATENT DOCUMENTS

| | | | |
|---|---|---|---|
| 2006/0004886 A1 | 1/2006 | Green et al. | |
| 2006/0080369 A1* | 4/2006 | Razdow et al. | 707/204 |
| 2006/0143243 A1* | 6/2006 | Polo-Malouvier et al. | 707/203 |
| 2006/0288081 A1 | 12/2006 | Sung et al. | |
| 2007/0088957 A1* | 4/2007 | Carson | G06F 21/64 713/176 |
| 2007/0118572 A1* | 5/2007 | Fischer et al. | 707/201 |
| 2007/0294246 A1 | 12/2007 | Evans et al. | |
| 2008/0021922 A1 | 1/2008 | Hailpern et al. | |
| 2008/0040388 A1* | 2/2008 | Petri | G06F 17/30997 1/1 |
| 2008/0126399 A1 | 5/2008 | MacGregor | |
| 2008/0134025 A1 | 6/2008 | Harada | |
| 2008/0177755 A1* | 7/2008 | Stern | G06F 21/568 1/1 |
| 2008/0178302 A1 | 7/2008 | Brock et al. | |
| 2008/0195509 A1 | 8/2008 | Bellacicco et al. | |
| 2008/0201381 A1 | 8/2008 | Desai et al. | |
| 2008/0270462 A1* | 10/2008 | Thomsen | G06F 17/30545 1/1 |
| 2009/0024608 A1 | 1/2009 | Deolalikar | |
| 2009/0063535 A1 | 3/2009 | Petri | |
| 2009/0125382 A1 | 5/2009 | Delepet | |
| 2009/0182780 A1 | 7/2009 | Wong et al. | |
| 2009/0199090 A1 | 8/2009 | Poston et al. | |
| 2009/0204595 A1 | 8/2009 | Dombrowski | |
| 2009/0234833 A1 | 9/2009 | Davis, II et al. | |
| 2009/0307137 A1* | 12/2009 | White | G06F 21/6245 705/51 |
| 2010/0107244 A1 | 4/2010 | Li et al. | |
| 2010/0114628 A1 | 5/2010 | Adler et al. | |
| 2010/0251374 A1 | 9/2010 | Dill et al. | |
| 2010/0287204 A1 | 11/2010 | Amini et al. | |
| 2010/0299339 A1 | 11/2010 | Kementsietsidis et al. | |
| 2011/0047056 A1 | 2/2011 | Overman et al. | |
| 2011/0296507 A1 | 12/2011 | Khosrowshahi | |
| 2011/0313848 A1* | 12/2011 | Vaidyanathan | G06Q 30/02 705/14.43 |
| 2012/0254048 A1 | 10/2012 | Roberts et al. | |
| 2012/0254128 A1 | 10/2012 | Bath et al. | |
| 2013/0018848 A1 | 1/2013 | Velasco | |
| 2013/0018858 A1 | 1/2013 | Velasco | |
| 2013/0018873 A1 | 1/2013 | Velasco | |
| 2013/0198145 A1 | 8/2013 | Avery et al. | |
| 2014/0025645 A1 | 1/2014 | Brown et al. | |
| 2014/0032513 A1 | 1/2014 | Gaither | |
| 2014/0280204 A1 | 9/2014 | Avery et al. | |
| 2014/0379657 A1 | 12/2014 | Avery | |

OTHER PUBLICATIONS

Friedrich II, John R, "Meta-data Version and Configuration Management in Multi-Vendor Environments", Proceedings of the ACM SIGMOD International Conference on Management of Data, p. 799-804, 2005, SIGMOD 2005: Proceedings of the ACM SIGMOD International Conference on Management of Data, ACMs.

FortiDB Version 3.2 Metadata Monitor User Guide, www.fortinet.com, Dec. 19, 2008.

M. Gao, "Recording How-Provenance on Probabilistic Databases", 2010 12th International Asia-Pacific Web Conference, Shanghai, China, pp. 205-211.

P. Groth, "A Distributed Algorithm for Determining the Provenance of Data", Fourth IEEE International Conference on eScience, 2008, pp. 166-173.

IBM, ip.com PriorArtDatabase, "System and Methods to Enable Trusted Provenance Tracking and Rights/Responsibilities Evaluation in Collaborative Developing Environment", Oct. 17, 2006 (8 pages).

Y. Simmhan, "A Framework for Collecting Provenance in Data-Centric Scientific Workflows", IEEE International Conference on Web Services, 2006, Bloomington, IN, (8 pages).

U.S. Appl. No. 13/183,847.

U.S. Appl. No. 13/183,850.

U.S. Appl. No. 13/358,594.

International Search Report and Written Opinion in counterpart International Application No. PCT/IB2012/052734, mailed Oct. 18, 2012.

International Search Report and Written Opinion, PCT/EP2013/050160, May 6, 2013, 8 pages.

\* cited by examiner

DOCUMENT 1 PROPERTIES

| DOCUMENT NAME | DOCUMENT 1 | PROVENANCE | 50% |
|---|---|---|---|
| | | LINEAGE | 50% |
| REVIEWER NAME | DON SMITH | PROVENANCE | 100% |
| | | LINEAGE | 100% |
| DEPARTMENT NAME | FINANCE | PROVENANCE | 20% |
| | | LINEAGE | 80% |

FIG.6

VERSIONING OF METADATA, INCLUDING PRESENTATION OF PROVENANCE AND LINEAGE FOR VERSIONED METADATA

CROSS-REFERENCE TO RELATED APPLICATIONS

This application is a non-provisional application that is related to (1) U.S. patent application Ser. No. 13/183,850, filed on the same date herewith, and entitled "Use and Enforcement of Provenance and Lineage Constraints"; and (2) U.S. patent application Ser. No. 13/183,847, filed on the same date herewith, and entitled "Determining and Presenting Provenance and Lineage for Content in a Content Management System"; the entire contents of each of which is hereby incorporated herein by reference.

BACKGROUND

1. Technical Field

The present invention relates to versioning and analysis of metadata.

2. Discussion of the Related Art

Metadata, which is data associated with the content of an object (e.g., a document or application, an audio, video or image file, etc.), has become of greater importance with the increasing ability to obtain and store different types of data. In many data storage systems, metadata associated with an object is stored with the content. In other data storage systems, metadata may be stored separately from the content.

BRIEF SUMMARY

Accordingly, embodiments of the present invention address monitoring the extent of changes in metadata values and include a method, a computer program product and a system for versioning metadata associated with content. In accordance with the embodiments of the invention, metadata associated with content is versioned by receiving updated values for the metadata and storing the updated values and also previous values for metadata separately from the content, comparing the updated values to the previous values of the metadata, and determining a modification indicator for the metadata based upon the comparison of the updated values to the previous values of the metadata, where the modification indicator provides an indication of an extent of differences between the updated and previous values. The modification indicator for the metadata can further be displayed to provide version information for the metadata to a user.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE SEVERAL VIEWS OF THE DRAWINGS

FIG. 6 shows an example embodiment of a graphical user interface showing provenance and lineage information for metadata associated with content of an object in accordance with the present invention.

DETAILED DESCRIPTION

In accordance with embodiments of the present invention, a method, system and computer program product provide versioning of metadata by storing different versions of metadata separately from the content of an object (e.g., a document or application, an audio, video, image and/or any other type of data file). The embodiments of the present invention further provide for determination and display of provenance and lineage information associated with the metadata as it is changed from the original version (i.e., the original metadata created for an object) to the present version (e.g., after a series of modifications have been made to the metadata for the object). The metadata versioning information can be displayed as a single attribute for the overall metadata or, alternatively, versioning information can be provided for each metadata attribute. In addition, the provenance and lineage values for the versioned metadata can be used for determining which version of metadata and/or which version of content will be used for a particular object (e.g., it may be desirable to only utilize versions of metadata attributes having provenance values of 80% or greater).

Metadata and content associated with an object can be directly related, such as when metadata changes in relation to changing content of the object (e.g., information about file size, author making a revision, revision date, etc.). However, many types of revisions to metadata can also be independent of revisions to content in relation to an object. For example, a revision can be made to metadata for an object in relation to certain types of information, such as a department name change, a file name change, a security change, etc., when there has been no change to the content of the object. By storing changes to metadata separately from changes to content associated with an object, one can apply finer or more granular control to monitoring and controlling the changes to metadata independently from monitoring changes to content. This further allows one to associate or map one version of metadata with a different version of content for a particular scenario. For example, one may wish to associate or map a previous or earlier version of metadata relating to security information associated with an object to a more recent or updated version of content associated with the object.

Figure 1:
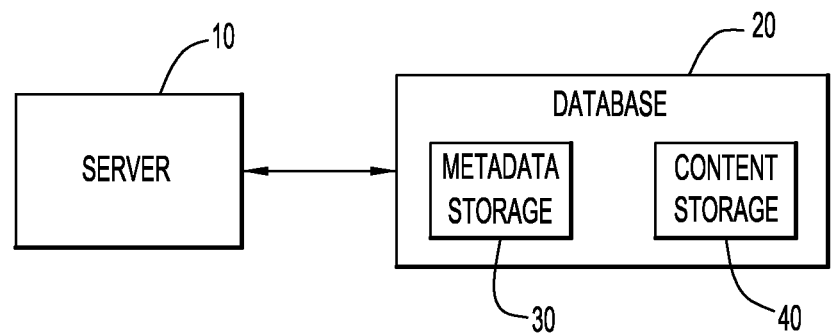
FIG. 1 is a diagrammatic illustration of an example computing environment for use with an embodiment of the present invention.

An example embodiment of the present invention is now described with reference to the block diagram of FIG. 1. A system comprises a server 10 that is connected with a database 20 to facilitate access by users (e.g., database managers, employees, clients, etc.) to content for objects stored within a content storage module 40 located within the database 20. The database 20 further includes a metadata storage module 30 that stores metadata associated with the content stored within the content storage module 40, such that metadata is stored separately from content so as to facilitate versioning of the metadata in a manner described below. In an example embodiment, the server 10 facilitates operations within the database 20. For example, responsive to a user request, server 10 may retrieve content for objects (e.g., documents or applications, audio, video and/or image files, or any other type of data file) from the content storage module 40 and may retrieve metadata associated with those objects from within the metadata storage module 30. For example, responsive to a user request, server 10 may save different (e.g., modified) versions of content within the content storage module 40 and different (e.g., modified) versions of metadata associated with the different content versions in the metadata storage module 30. The server 10 can communicate with a user via any suitable connection including, without limitation, via cloud computing, via network computing in which the server 10 is operatively coupled to one or more other servers or other devices, and/or other devices via any suitable type of carrier wave or signal for transfer of data from one source to another utilizing a suitable communication medium (e.g., bulletin board, network, LAN, WAN, Intranet, Internet, etc.).

Any suitable computer systems implemented by any type of processor or other hardware and/or other processing circuitry can be configured to provide the server, database and metadata and content storage modules. That is, the sever, database and metadata and content storage modules may be implemented by any quantity of conventional or other computer systems or devices (e.g., computer terminals, personal computers of all configurations, including tablet, laptop, etc.), cellular telephones, personal data assistants etc., and may include any available operating system and/or any available or custom software (e.g., browser software, communications software, word processing software, etc.). These systems may further include types of displays and input devices (e.g., keyboard, mouse, voice recognition, etc.) to enter and/or view information.

The metadata can be stored within the metadata storage module 30 separately from content stored within the content storage module 40 in any suitable manner. Some example embodiments of structures in which metadata can be stored separately from content for a particular data object are now described with reference to FIGS. 2-4.

Figure 2:
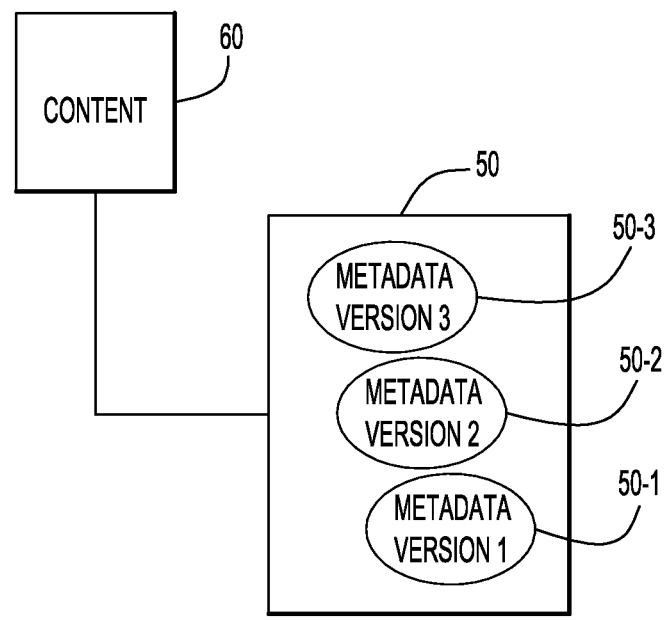
FIG. 2-4 are diagrammatic illustrations of examples showing different ways in which versioned metadata can be stored separately from content associated with a data object in accordance with the present invention.

Referring to FIG. 2, a structure for storing metadata is schematically depicted in which a block of metadata 50 is stored separately from content 60 to which the metadata is associated. The metadata 50 includes different versions, shown as version 1 (50-1), version 2 (50-2) and version 3 (50-3). The metadata 50 is associated generally with the content 60, but the specific versions of metadata are separate and independent from different versions of content 60. As shown in FIG. 2, the relationship between content 60 and the block of metadata 50 can be via a pointer or some relationship (parent/child) in a data structure. In this embodiment, a modification to any portion of the metadata (e.g., a change in a document name, revision by a particular user or reviewer, etc.) can result in storage of the entire metadata into a new version construct (e.g., a new row or a new table associated with the different version of metadata) stored in block 50. This structure provides for storage of metadata at a content management layer of the database.

Figure 3:
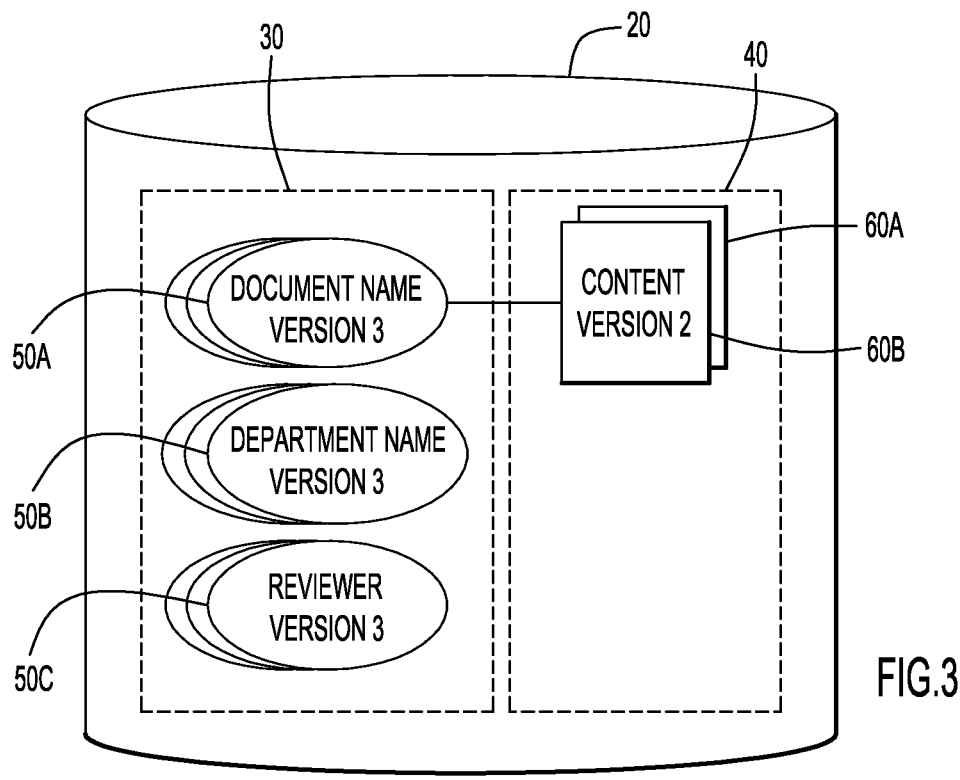

FIG. 3 schematically depicts another example of a different structure for storing metadata 50A separately from content, where each modification of a type of metadata is stored separately within the metadata storage module 30 to provide more granular control of the metadata. In this example, versions of different types of metadata (such as document name 50A, department name 50B and reviewer 50C as shown in the figure) are stored in an ordered format, such as in one or more tables, where a new version of metadata results in the addition of a new row to a table that includes the new version of metadata. As shown in the example embodiment of FIG. 3, each metadata type includes three different data tables that correspond with different versions of metadata stored within module 30. In this example, different versions of metadata types can be mapped or linked with different versions of content (e.g., content version 1 (60A) and content version 2 (60B) as shown in the figure). For example, a particular version of metadata associated with a document name 50A (such as version 3) can be associated with a particular content version (e.g., content version 2 (60B)). This linking between different versions of metadata and content can also be adjusted or changed based upon user preference (e.g., in scenarios in which a user may wish to utilize a particular version of one or more metadata types with a particular version of content). The structure shown in FIG. 3 is at the database layer and uses typical database constructs for performing versioning operations.

Figure 4:
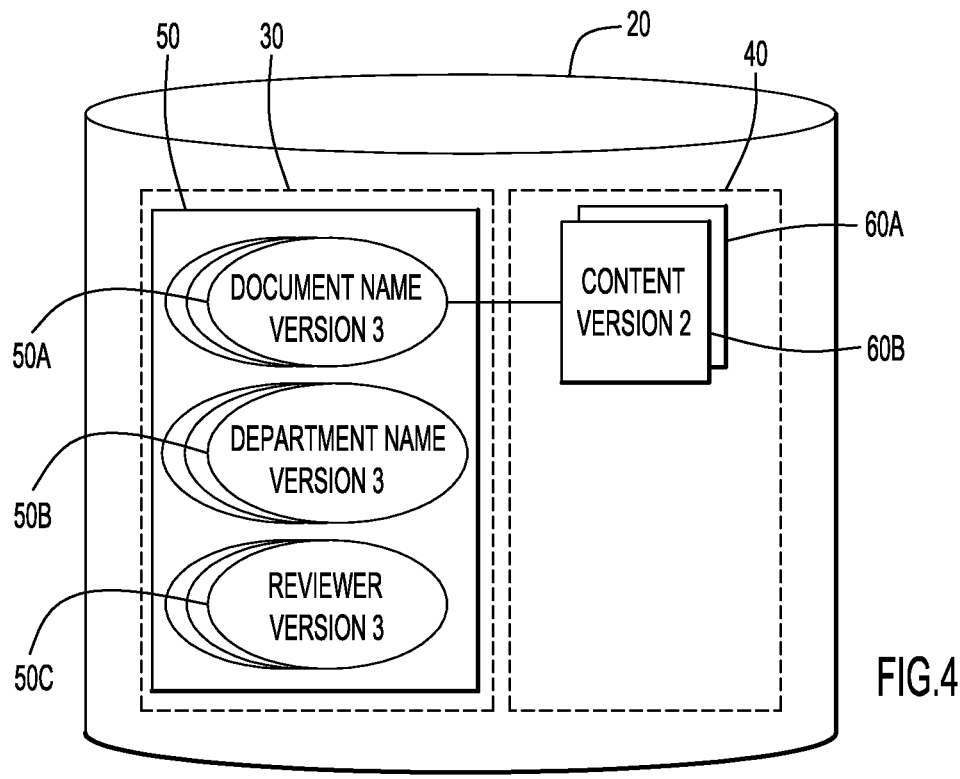

The construct schematically depicted in FIG. 4 provides a revised version of FIG. 3, where the server 10 has access to the different versions of content 60A, 60B in the content storage module 40 and retrieves or performs actions on metadata versions 50A, 50B, 50C stored in metadata storage module 30 based upon changes to the content and/or other changes made to metadata which may be independent of changes to the content (e.g., a change to a document name). In particular, the different versions of metadata are initially stored as binary data in a block. The different versions of metadata that are created when metadata types are changed can be linked using a linked list data structure within the metadata storage module 30. The server 10 reads the metadata from the module 30 and converts the data into metadata versions (shown as the different metadata versions 50A, 50B, 50C in block 50 of FIG. 4) that it retrieves as needed. Thus, the way in which the metadata versions are initially stored within the metadata storage module 30 in FIG. 4 is less complex than the embodiment of FIG. 3, since they are stored as, e.g., a linked list data structure. The server 10 performs that function of processing the data and converting it into the various tables having different metadata versions based upon metadata types (as shown in block 50).

The versioning and storing of metadata separate from content within the database (e.g., utilizing any of the structural formats as described above and shown in FIGS. 2-4) facilitates finer control and analysis of the metadata. This in turn allows for determinations in differences between different versions of metadata in order to determine information such as provenance and lineage associated with different versions of metadata. This can further allow for control of which versions of metadata and/or content to use, e.g., based upon the provenance or lineage information associated with the different versions of metadata.

Figure 5:
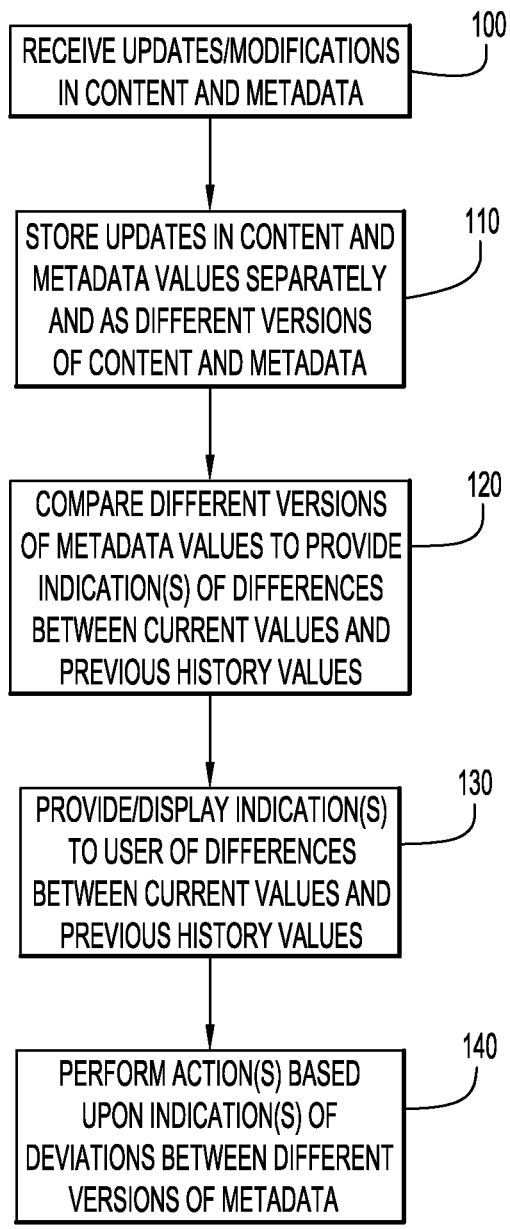
FIG. 5 provides a flowchart depicting an example method of versioning metadata in accordance with the present invention.

An example method for versioning metadata and determining the extent of deviations between different versions of metadata is now described with reference to the flowchart of FIG. 5. When a user (e.g., a manager, reviewer, client, or other person) accesses an object such as a document or application from the database 20, via the server 10, any updates or modifications (e.g., changes, insertions and/or deletions) to the object by the user are received by the database 20 (step 100) and stored as different versions of content and metadata (step 110). The different versions of content and metadata are stored separately, utilizing any suitable construct or format for associating the different versions of metadata with different versions of content (such as any of the formats described above and depicted in FIGS. 2-4).

The different versions of metadata are compared to provide an indication of the differences between current metadata values and previous history (e.g., earlier version) metadata values (step 120). The comparison and determination of an indication can be performed automatically by the server 10 and/or any other processing module associated with the database 20. Any suitable indication of differences between different versions of metadata values can be determined.

Two example indications that provide some measurement of a difference between two different versions of metadata values are provenance and lineage. A provenance indication refers to any detected change in the information associated with a metadata value from one version (e.g., the current version) to another (e.g., the original version). For example, consider a metadata value such as a document name which is defined by a number of characters. A provenance indication of 50% may indicate a change in 50% of the characters from a previous version (e.g., original version) of the document name to another (e.g., current) version of the document name. Alternatively, a provenance indication may be calculated based upon how many versions separate two versions of interest. For example, a second version of a metadata value can have a provenance of 50% when compared with the original version of the metadata value, while a fourth version of a metadata value can have a provenance of 25% when compared with the original version of the metadata value, etc. Any other identifiable change or difference between metadata values from different versions can also be quantified as a percentage change or any other suitable quantifier of a change.

A lineage indication refers to how many different users modified a particular metadata value. For example, a metadata value having a lineage of 100% would indicate a single user has modified a particular metadata value, while a lineage of 50% would indicate that two users have modified the metadata value, etc.

The provenance, lineage and/or other indications comparing and defining differences or an extent with which metadata has been modified can be determined as an overall attribute for the metadata (e.g., a calculation or determination of an indication based upon an entire set of metadata values associated with a particular content object such as a document or application). Alternatively, indications can be determined separately for individual metadata values associated with content. The indications determined based upon different versions of metadata values can be provided to the user in any suitable format (step 130), such as in a display format using a graphical user interface. For example, a report can be generated that shows differences between versions of any number of selected metadata values, where the user can switch between different versions to assess how indications such as provenance and lineage change as the metadata associated with content evolves from its original version to another version.

An example embodiment showing a graphical display of provenance and lineage values for specific metadata values is shown in FIG. 6. Referring to FIG. 6, metadata changes for a document having a current document name of "Document 1" are displayed via a graphical user interface, where the provenance and lineage indications for the metadata values "Document Name", "Reviewer Name" and "Department Name" are shown. Other possible metadata values and their corresponding provenance and lineage values can also be shown in the graphical display for this document, including interactive features that would allow a user to change or modify the display to show different provenance and lineage values based upon user preference and selection of metadata values of interest. The display of provenance and lineage values shown in FIG. 6 provides an indication of one or more originators of a metadata change (e.g., the current reviewer is identified as "Don Smith"), how often the document name has changed and also how many different departments have updated the document (e.g., the current update occurred in the Finance department). Such information is useful to determine the origins and history of metadata changes, how changes to metadata have been controlled (e.g., by which reviewers and/or which departments), and also how much content may have been changed in any one or more updates/revisions.

Optionally, one or more actions can be taken by the system based upon the indication values that determine to what extent or degree current versions of metadata are different from previous versions of metadata (step 140). In an example embodiment, if one or both of the provenance and lineage values decreases below a threshold value (e.g., below 50%), the system can implement and enforce limitations or restraints on the extent to which content and/or metadata associated with the content is further revised. For example, in a scenario in which lineage of a metadata value such as reviewer name that is associated with a document saved on the database approaches or falls below a threshold value of 25%, the system may be configured to implement a tool that prevents or limits a further revision to the document by additional reviewers that would result in a further reduction of the lineage value. A similar procedure could also be applied for provenance values associated with content of a document that approach or fall below a threshold value.

Alternatively, the system can be configured to facilitate selection of metadata associated with content by a user that meets a certain threshold. For example, a user may wish to select or include in search results only metadata values with provenance values of a certain value (e.g., 80% or greater) for a particular scenario. In another example, a user may select or include in search results only metadata values with lineage values of a certain value (e.g., 75% or greater) for a particular scenario. This allows a user to be highly selective in choosing metadata values (and content associated with the metadata values) that meet a specific criteria of the user.

Thus, the embodiments of the present invention facilitate the ability to track and monitor different versions of metadata values for comparison purposes by storing versioned metadata separately from versioned content for an object within a database of a system. This provides a user of the system with the ability to determine a number of pieces of information associated with changes made to the object during a select time period, such as the degree of originality of metadata associated with content for the object (e.g., based upon a provenance determination), the degree or number of persons associated with metadata changes (e.g., based upon a lineage determination, e.g., was there a single person making changes or was it a collaborative effort by a number of different persons), and how much content may have been changed in a single update or revision (e.g., by comparing the provenance of a metadata value calculated based upon differences in content between two consecutive versions of the document or application, such as Version 2 and Version 3). In addition, the separation of metadata changes from content changes for an object allows one to easily map or link one version of metadata to a different version of content for a particular scenario. The tracking and monitoring of differences between metadata values based upon different metadata versions in this manner facilitates finer or more granular control of the use of the metadata for database operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Perl, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of versioning metadata associated with content for an object, wherein the metadata comprises data selected from the group consisting of information about a file size of the object, information about an author making a revision to content for the object, information about a title of the object, information about a revision date of the object, information about access security associated with the object, and any one or more combinations thereof, the method comprising:
   receiving an updated value for the metadata and storing the updated value for the metadata separately from the content; and
   determining a modification indicator for the metadata based upon a comparison of the updated value for the metadata to previously stored values for the metadata, wherein the modification indicator provides a quantified value representing an indication of extent of differences between the updated value for the metadata and any one or more of the previously stored values for the metadata, and wherein the determination of the modification indicator further comprises determining a lineage value for the updated value for the metadata, the lineage value representing a change in a number of users associated with modification of the metadata from the previously stored values for the metadata to the updated value for the metadata.

2. The method of claim 1, further comprising:
   displaying the modification indicator for the metadata to provide version information for the metadata.

3. The method of claim 1, wherein the determination of the modification indicator comprises determining a provenance value for the updated value for the metadata, wherein the provenance value comprises information about a degree of difference between the updated value for the metadata and any one or more of the previous values for the metadata.

4. The method of claim 1, further comprising:
   utilizing the modification indicator to control additional updates to values for the metadata based upon a comparison of the modification indicator with a threshold value.

5. The method of claim 1, further comprising:
   ascertaining at least one originator of the updated value for the metadata.

6. A system for versioning metadata associated with content for an object, wherein the metadata comprises data selected from the group consisting of information about a file size of the object, information about an author making a revision to content for the object, information about a title of the object, information about a revision date of the object, information about access security associated with the object, and any one or more combinations thereof, the system comprising:
   a database including a content module to store the content and a metadata storage module to store metadata updates associated with the content stored in the content module; and
   a server to access the database, the server configured with logic to:
   receive an updated value for the metadata and store the updated value for the metadata separately from the content in the database; and
   determine a modification indicator for the metadata based upon a comparison of the updated value for the metadata to previously stored values for the metadata, wherein the modification indicator provides a quantified value representing an indication of extent of differences between the updated value for the metadata and any one or more the previously stored values for the metadata, and wherein the determination of the modification indicator further comprises determining a lineage value for the updated value for the metadata, the lineage value representing a change in a number of users associated with modification of the metadata from the previously stored values for the metadata to the updated value for the metadata.

7. The system of claim 6, wherein the system is further configured to display the modification indicator for the metadata to provide version information for the metadata.

8. The system of claim 6, wherein the determination of the modification indicator by the server logic comprises determining a provenance value for the updated value for the metadata, wherein the provenance value comprises information about a degree of difference between the updated value for the metadata and any one or more of the previous values for the metadata.

9. The system of claim 6, wherein the server is further configured with logic to:
   utilize the modification indicator to control additional updates to values for the metadata based upon a comparison of the modification indicator with a threshold value.

10. The system of claim 6, wherein the server is further configured with logic to:
    ascertain at least one originator of the updated value for the metadata.

11. A computer program product for versioning metadata associated with content for an object, wherein the metadata comprises data selected from the group consisting of information about a file size of the object, information about an author making a revision to content for the object, information about a title of the object, information about a revision date of the object, information about access security associated with the object, and any one or more combinations thereof, the computer program product comprising:
    a computer readable storage device comprising a non-transitory computer readable storage medium having computer readable program code embodied therewith, the computer readable program code configured to:
    receive an updated value for the metadata and store the updated value for the metadata separately from the content; and
    determine a modification indicator for the metadata based upon a comparison of the updated value for the metadata to previously stored values for the metadata, wherein the modification indicator provides a quantified value representing an indication of extent of differences between the updated value for the metadata and any one or more of the previously stored values for the metadata, and wherein the determination of the modification indicator further comprises determining a lineage value for the updated value for the metadata, the lineage value representing a change in a number of users associated with modification of the metadata from the previously stored values for the metadata to the updated value for the metadata.

12. The computer program product of claim 11, wherein the computer readable program code is further configured to facilitate a display of the modification indicator for the metadata to provide version information for the metadata.

13. The computer program product of claim 11, wherein the determination of the modification indicator by the computer readable program code comprises determining a provenance value for the updated value for the metadata, wherein the provenance value comprises information about a degree of difference between the updated value for the metadata and any one or more of the previous values for the metadata.

14. The computer program product of claim 11, wherein the computer readable program code is further configured to:
   utilize the modification indicator to control additional updates to values for the metadata based upon a comparison of the modification indicator with a threshold value.

15. The computer program product of claim 11, wherein the computer readable program code is further configured to:
   ascertain at least one originator of the updated value for the metadata.

\* \* \* \* \*